United States Patent
Silva

(10) Patent No.: US 10,985,607 B1
(45) Date of Patent: Apr. 20, 2021

(54) BACKUP POWER SUPPLY SYSTEM

(71) Applicant: Pedro Silva, Rockland, MA (US)

(72) Inventor: Pedro Silva, Rockland, MA (US)

( * ) Notice: Subject to any disclaimer, the term of this patent is extended or adjusted under 35 U.S.C. 154(b) by 0 days.

(21) Appl. No.: 16/541,777

(22) Filed: Aug. 15, 2019

(51) Int. Cl.
*H02J 7/10* (2006.01)
*H02J 9/00* (2006.01)
*H02J 9/06* (2006.01)
*H02H 9/04* (2006.01)

(52) U.S. Cl.
CPC ............. *H02J 9/062* (2013.01); *H02H 9/04* (2013.01); *H02J 9/068* (2020.01)

(58) Field of Classification Search
CPC ........................ H02J 9/062; H02J 9/068; H02J 7/0042–0045; H02J 9/00; H02J 9/04; H02H 9/04; Y10T 307/516
USPC ...................................... 307/66, 64; 320/113
See application file for complete search history.

(56) References Cited

U.S. PATENT DOCUMENTS

| | | | |
|---|---|---|---|
| 5,844,328 A | 12/1998 | Furst | |
| 6,593,723 B1 * | 7/2003 | Johnson | H01R 25/006 |
| | | | 320/113 |
| 8,049,364 B2 | 11/2011 | Shakespeare et al. | |
| 2005/0286184 A1 * | 12/2005 | Campolo | H02H 1/0015 |
| | | | 361/42 |
| 2011/0201720 A1 * | 8/2011 | Piontek | C09D 4/00 |
| | | | 522/167 |

* cited by examiner

*Primary Examiner* — Toan T Vu
(74) *Attorney, Agent, or Firm* — Sanchelima & Associates, P.A.; Christian Sanchelima; Alexander J. Rodriguez

(57) ABSTRACT

A backup power supply comprising a removably attachable battery that is configured to provide a backup power supply to an electrical appliance is disclosed herein. An electrical housing is configured to be mounted on the electrical appliance. A removably attachable battery is mounted on the electrical housing, which comprises a circuitry that includes a sensing device that is configured to detect primary power supply from a main power supply to the electrical appliance. A transfer switch is configured to select one of primary power supply provided by the main power supply or the backup power supply provided by removably attachable battery based on the sensing device deciding what is appropriate. A control circuitry is configured to control the transfer switch to engage the removably attachable battery in the circuitry when the sensing device fails to detect the primary power supply from the main power supply to the electrical appliance.

1 Claim, 3 Drawing Sheets

BACKUP POWER SUPPLY SYSTEM

BACKGROUND OF THE INVENTION

1. Field of the Invention

The present invention relates to a backup power supply system. More particularly, the present invention relates to backup power supply system that provides backup power supply to electrical appliances during a power outage.

2. Description of the Related Art

Several designs for backup power supply systems have been designed in the past. None of them, however, include a battery backup system for electrical appliances comprising a rechargeable battery which is mounted to the side of the appliance with a holder, and is engaged when primary power is cut off to the appliance to which the battery is attached. The majority of electrical household appliances depend upon electrical power for operation. Electrical power, generated at a remote power generating plant, is provided to households through electrical cables. On certain occasions, power outages can occur for a variety of reasons, including failure of a power grid or power transformer, power line damage resulting from natural disasters, lightning strikes, and in many other ways. In an event of a power outage, household and electrical appliances are deprived of their operating power and are rendered useless. In addition, power outages, during times of floods, high wind, wildfires, ice and snowstorms, and other natural disasters are relatively common. When power fails, one of the most disturbing consequences is being left powerless in the dark, especially for the elderly or families with small children.

Applicant believes that a related reference corresponds to U.S. Pat. No. 5,844,328 issued to Robert Furst that discloses a backup device for electric appliance specifically or electric pump. Applicant also believes another related reference corresponds to United States Utility Patent application US20070228835A1 assigned to Diran Varzhabedian that discloses backup power system for electrical appliances. Applicant believes another related reference corresponds U.S. Pat. No. 8,049,364 issued to Electrikus Inc that discloses Back-up power system. Applicant also believes another related reference corresponds United States Utility Patent application 20060179870 issued to American Trim LLC that discloses Refrigerator power back up system.

However, the above references differ from the present invention because the present invention discloses a backup power supply system that provides power supply to electrical appliances during a power outage in an efficient and cost effective manner that can be used for all appliances.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a backup power supply system and avoid the drawbacks of the prior art.

It is another object of the present invention to be able to be retrofitted onto all existing appliances.

It is still another object of the present invention to be easy and simple to assemble, install, and use.

It is yet still another object of the present invention to be durable.

Further objects of invention will be brought out in following part of specification, wherein detailed description is for purpose of fully disclosing invention without placing any limitations thereon.

BRIEF DESCRIPTION OF DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The invention relates to a backup power supply, comprising a removably attachable battery that is configured to provide a backup power supply to electrical appliance. An electrical housing may be configured to be mounted on an electrical appliance. A removably attachable battery may be mounted on the electrical housing. The electrical housing comprises a circuitry that includes a sensing device which is configured to detect primary power supply from a main power supply to electrical appliances. A transfer switch may be configured to select one of the primary power supplies provided by main power supply or backup power supply provided by removably attachable battery based on detection of primary power supply by the sensing device. A control circuitry may be configured to control a transfer switch to engage the removably attachable battery in circuitry when the sensing device fails to detect primary power supply from the main power supply to the electrical appliance.

Figure 1:
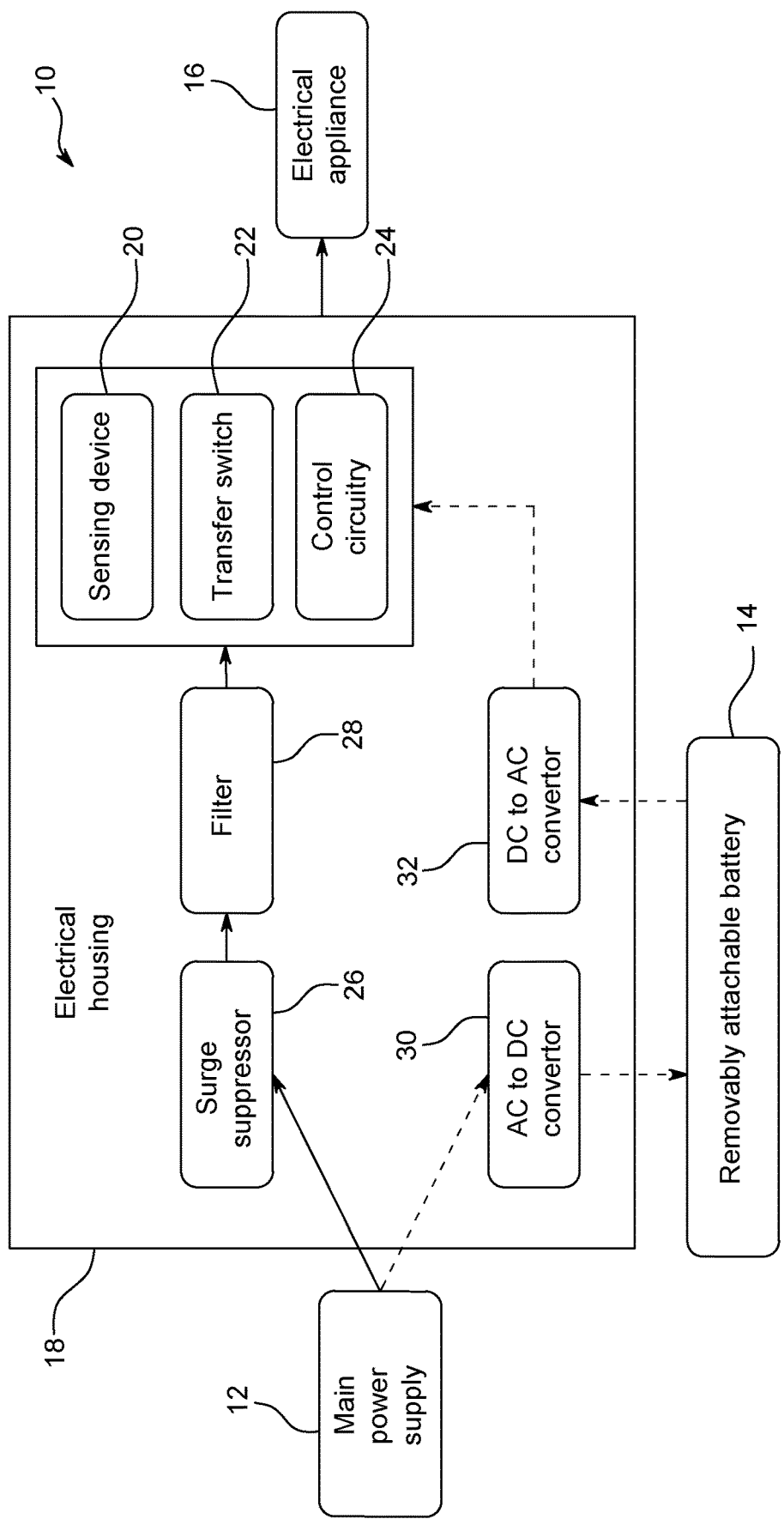
FIG. 1 represents an exemplary block diagram of a backup power supply system 10 of present invention, according to various embodiments described herein.
Figure 2:
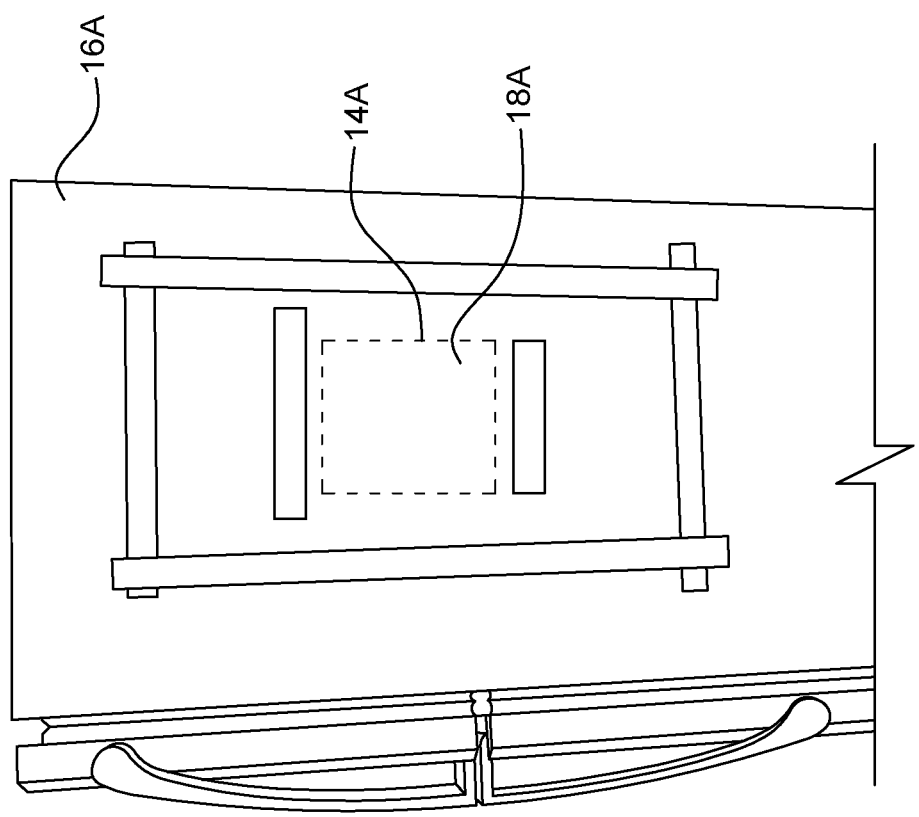
FIGS. 2-2A represent exemplary backup power supply system 10 mounted on one or more electrical appliances, according to various embodiments described herein.
Figure 2A:
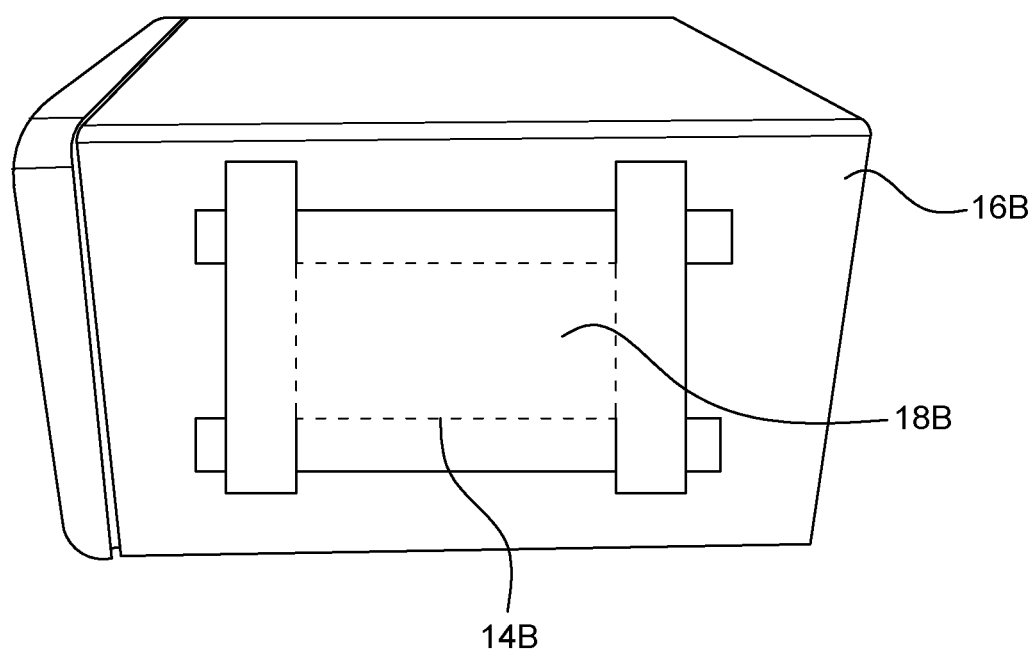

Various features and embodiments of a backup power supply are explained in conjunction with the description of FIG. 1 and FIGS. 2-2A.

FIG. 1 represents an exemplary backup power supply system 10 of the present invention, according to various embodiments described herein. As illustrated, backup power supply system 10 may comprise a main power supply 12, a removably attachable battery 14, an electrical appliance 16, an electrical housing 18, a sensing device 20, a transfer switch 22, a control circuitry 24, a surge suppressor 26, a filter 28, an alternating-current (AC) to direct-current (DC) convertor 30, and a DC to AC convertor 32.

As illustrated, in accordance with an embodiment, main power supply 12 may be connected with electrical appliance 16 via surge suppressor 26, filter 28, and a circuitry comprising sensing device 20, transfer switch 22, and control circuitry 24. In such an embodiment, electrical appliance 16 receives primary power supply from main power supply 12 in absence of any power outage. In accordance with another embodiment, main power supply 12 may be connected with electrical appliance 16 via AC to DC convertor 30, removably attachable battery 14, and DC to AC convertor 32. In such an embodiment, electrical appliance 16 receives backup power supply from removably attachable battery 14 in the case of a power outage. In such embodiment, removably attachable battery 14 continues to store DC voltage based on continued charging by main power supply 12.

In some example embodiments, main power supply 12 may be configured to provide primary power supply to electrical appliance 16. Main power supply 12 may be a general-purpose AC electric power supply. A voltage of (nominally) 230 V and a frequency of 50 Hz of primary power supply may be used in certain geographies, such as Europe, most of Africa, most of Asia, much of South America and Australia. In North America, the most common combination is 120 V and a frequency of 60 Hz. Other voltages exist, and some countries may have, for example, 230 V but 60 Hz. Other voltages may be suitable depending on the regulations and requirements for various locations.

Removably attachable battery 14 may be configured to provide backup power supply to electrical appliance 16. Removably attachable battery 14 may be rechargeable and store DC voltage to serve as backup power for electrical appliance 16. In some example embodiments, removably attachable battery 14 may be a Lithium-ion battery. In some example embodiment, usage of a specific battery type of removably attachable battery 14 may be based on device type of electrical appliance 16. As illustrated in FIGS. 2-2A, a first type of removably attachable battery 14A may have a first size and a first charging capacity and may be used for a refrigerator 16A, a second type of removably attachable battery 14B may have a second size and a second charging capacity and may be used for a microwave 16B.

In some example embodiments, electrical appliance 16 may include but not limited to, an evaporative cooler, an air conditioner, an air ionizer, an air purifier, an attic fan, a bed side lamp, a back boiler, a ceiling fan, a central vacuum cleaner, a clothes dryer, a clothes iron, a washing machine, a refrigerator, a microwave, a mobile phone, or other such electrical appliances. In some example embodiments, as illustrated in FIGS. 2-2A, for example, device types of electrical appliance 16 may correspond to refrigerator 16A, microwave 16B. However, it may be noted that exemplary electrical appliances in FIGS. 2-2A are shown for illustration purpose. Proposed backup power supply system 10 may provide backup power to different types of electrical appliance 16, in addition to the ones described above.

In some example embodiments, electrical housing 18 may be configured to be mounted on electrical appliance 16. Removably attachable battery 14 may be mounted on electrical housing 18 to provide backup power supply to electrical appliance 16 in case of any power outage. Electrical housing 18 may comprise a circuitry and various other electronic components. Circuitry may further comprise at least sensing device 20, transfer switch 22, and control circuitry 24. Other components may correspond to surge suppressor 26, filter 28, AC to DC convertor 30, and DC to AC convertor 32. In some example embodiments, electrical housing 18 may comprise a charging port which may be configurable to charge removably attachable battery 14.

In some example embodiments, sensing device 20 may be configured to detect primary power supply from main power supply 12 to electrical appliance 16 to confirm that there is no power outage. Sensing device 20 may comprise a current sensor or a voltage sensor. In some example embodiments, current sensor may detect current passed by main power supply 12 to electrical appliance 16. In other example embodiments, voltage sensor may detect, monitor and measure the supply of voltage from the main power supply 12.

In some example embodiments, transfer switch 22 may be configured to select one of primary power supply provided by main power supply 12 or backup power supply provided by removably attachable battery 14. Transfer switch 22 may select one of main power supply 12 or removably attachable battery 14 based on primary power supply detected by sensing device 20. For example, transfer switch 22 may select main power supply 12 based on primary power supply detected by sensing device 20. In another example, transfer switch 22 may select removably attachable battery 14 based on primary power supply not detected by sensing device 20.

In some example embodiments, control circuitry 24 may be configured to control transfer switch 22 to engage removably attachable battery 14 in circuitry when sensing device 20 fails to detect primary power supply from main power supply 12 to electrical appliance 16.

In some example embodiments, surge suppressor 26, connected to main power supply 12, may be configured to provide protection to electrical appliance 16 from power surges and power fluctuations by clamping peak voltage to pre-defined levels in primary power supply provided by main power supply 12.

In some example embodiments, filter 28 connected to surge suppressor 26, may be configured to prevent transient loss and eliminate noise from primary power supply provided by main power supply 12.

In some example embodiments, AC to DC converter 30 connected between main power supply 12 and removably attachable battery 14 may be configured to rectify AC voltage provided by main power supply 12 to obtain DC voltage and store DC voltage in removably attachable battery 14.

In some example embodiments, a DC to AC converter 32 connected between removably attachable battery 14 and electrical appliance 16 may be configured to convert DC voltage stored in removably attachable battery 14 to AC voltage and provide converted AC voltage to electrical appliance 16. In some example embodiments, converted AC voltage, provided to electrical appliance 16, may correspond to backup power supply provided by removably attachable battery 14 when transfer switch 22 selects backup power supply provided by removably attachable battery 14 based on failed detection of primary power supply by sensing device 20. For example, during power outage, sensing device 20 may fail to detect primary power supply from the main power supply 12, which makes the transfer switch 22 to select backup power supply provided by removably attachable battery 14 to electrical appliance 16.

In some example embodiments, transfer switch 22 may select primary power supply provided by main power supply 12 based on successful detection of primary power supply by sensing device 20. For example, when electrical appliance 16 receives backup power supply provided by removably attachable battery 14, sensing device 20 detects primary power supply from main power supply 12 after the power outage. Transfer switch 22 may again select main power supply 12 and may deselect backup power supply provided by a removably attachable battery 14 to the electrical appliance 16.

FIGS. 2-2A represent various use cases of implementation of exemplary backup power supply system 10, according to various embodiments described herein.

As illustrated in FIG. 2, first type of removably attachable battery 14A having first size and first charging capacity, may be used for first device type, such as refrigerator 16A. First type of removably attachable battery 14A may be mounted on corresponding electrical housing 18A mounted on a side of refrigerator 16A. In various example embodiments, electrical housing 18A may be mounted on side of refrigerator 16A using one of various means of attachment. Attachment means may be, for example, an adhesive tape with strong bonding. Size and charging capacity of first type of removably attachable battery 14A which may be mounted on refrigerator 16A may vary depending upon type, size, and amount of power consumed by refrigerator 16A.

As illustrated in FIG. 2A, second type of removably attachable battery 14B having second size and second charging capacity, may be used for second device type, such as microwave 16B. Second type of removably attachable battery 14B may be mounted on corresponding electrical housing 18B mounted on a side of microwave 16B. In various example embodiments, electrical housing 18B may be mounted on side of microwave 16B using one of various means of attachment. Attachment means may be, for example, an adhesive tape with strong bonding. Size and charging capacity of second type of removably attachable battery 14B which may be mounted on microwave 16B may vary depending upon type, size, and amount of power consumed by microwave 16B.

The proposed backup power supply system 10 of the present invention will not only sustain supplying power to an electrical appliance during the power outage, but also lower the cost of the backup power supply. Therefore, the backup power supply system 10 of the present invention will be cheaper and more practical than conventional backup power supply system.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A back up power supply system, consisting of:
   a) a microwave;
   b) a main power supply providing a primary power supply, wherein said main power supply is an AC electric power supply;
   c) an electrical housing: consisting of:
      i) a surge suppressor which receives power from said main power supply, and a filter coupled to said surge suppressor, wherein said surge suppressor provides protection to said microwave from power surges and power fluctuations by clamping peak voltage to pre-defined levels in said primary power supply provided by said main power supply, wherein said filter prevents transient loss and eliminate noise from said primary power supply provided by said main power supply;
      ii) a circuitry consisting of a sensing device, a transfer switch, and a control circuitry, wherein said sensing device detects said primary power supply of said main power supply, wherein said transfer switch to select one of said primary power supply or a backup power supply; and
      iii) an AC to DC converter engaging with said main power supply and a DC to AC converter stored within said electrical housing, said DC to AC convertor coupled to said circuitry;
   d) a removably attachable battery coupled between said AC to DC convertor and said DC to AC converter, wherein said control circuitry engages said removably attachable battery when said sensing device fails to detect said primary power supply from said main power supply to said electrical appliance, wherein said removably attachable battery is a lithium-ion battery; and
   e) a holder to couple said electrical housing to a sidewall of said microwave, wherein said holder is adhesives tape which surrounds four perimeter sides of said electrical housing to be engaged with said sidewall of said microwave, wherein said electrical housing is in constant abutting engagement with said sidewall of said microwave.

* * * * *